G. L. STEVENS.
SPOON HOLDER.
APPLICATION FILED MAY 16, 1919.
1,323,924.
Patented Dec. 2, 1919.
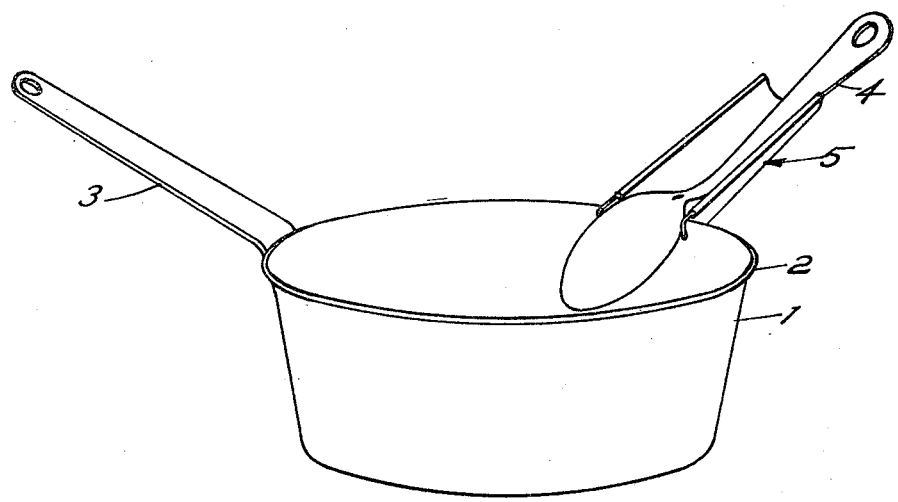
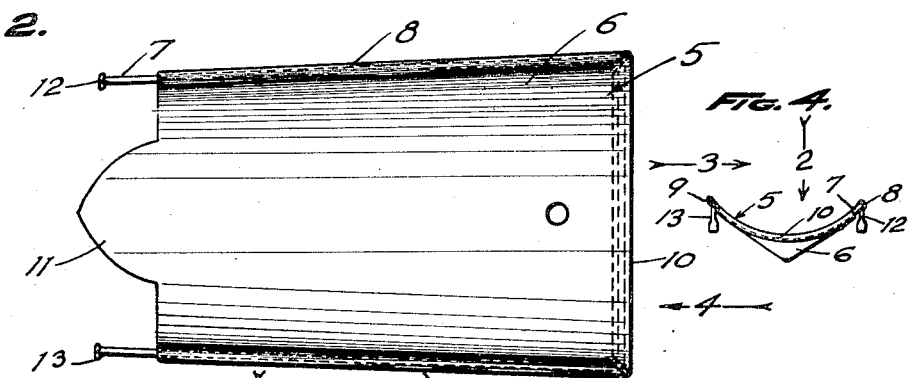
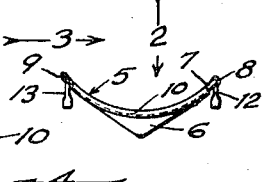
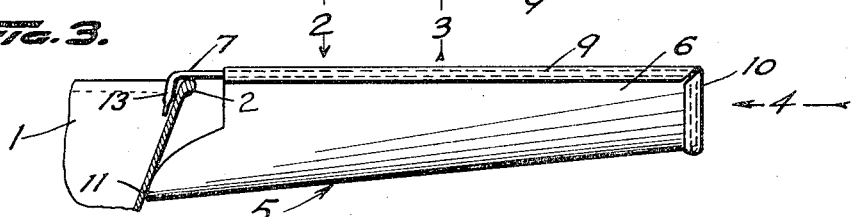
INVENTOR.
GEORGE L. STEVENS.
BY
Hazard & Miller
ATTORNEYS.

UNITED STATES PATENT OFFICE.

GEORGE L. STEVENS, OF LONG BEACH, CALIFORNIA.

SPOON-HOLDER.

1,323,924.  Specification of Letters Patent.  Patented Dec. 2, 1919.

Application filed May 16, 1919. Serial No. 297,633.

*To all whom it may concern:*

Be it known that I, GEORGE L. STEVENS, a subject of the King of Great Britain, residing at Long Beach, in the county of Los Angeles and State of California, have invented new and useful Improvements in Spoon-Holders, of which the following is a specification.

My object is to make a spoon holder, and my invention consists of the novel features herein shown, described and claimed.

Figure 1 is a perspective of a stew pan provided with a spoon holder embodying the principles of my invention.

Fig. 2 is a top plan view of the spoon holder as seen looking in the direction indicated by the arrows 2 in Figs. 3 and 4.

Fig. 3 is a side elevation looking in the direction indicated by the arrows 3 in Figs. 2 and 4.

Fig. 4 is an end elevation looking in the direction indicated by the arrows 4 in Figs. 2 and 3.

The stew pan 1 is a flat pan having a rim 2 around its upper edge and a handle 3 extending from one side. In the operation of cooking fruit and the like in a pan of this kind it is necessary to use a spoon 4 at intervals, and the object of my invention is to provide a convenient means for holding the spoon 4 between the intervals. For this purpose I provide the spoon holder 5.

The details of the spoon holder 5 are shown in Figs. 2, 3 and 4 and are as follows:

A flat piece of sheet metal 6 is cut to the desired size and shape and a wire 7 is run around the sides 8 and 9 and across the end 10 in the usual way of producing wired edges. A tongue 11 extends from the unwired end of the sheet and the wires extend from the unwired end of the sheet to produce the hooks 12 and 13. The sheet 6 is bent longitudinally half way between the sides 8 and 9 to produce a trough.

In the practical operation the spoon holder 5 is applied by placing the hooks 12 and 13 over the rim 2 and the tongue 11 against the outer face of the pan under the rim 2, then the spoon may be laid in the trough with the ball of the spoon projecting over the pan so as to drain into the pan.

The plate 6 is tapered, the widest part being at the end having the tongue 11 so that when the plate is bent to form a trough as in Fig. 3 it presents a straight sided rectangular appearance as in Fig. 2.

Various changes may be made without departing from the spirit of my invention as claimed.

I claim:

1. A spoon holder comprising a metal trough, a wire inserted along the two sides of the trough and projecting from one end forming hooks adapted to hook over a rim of a vessel and a tongue formed integral with and extending from the same end of the trough as the hooks adapted to bear upon the side of the vessel below the rim thereof whereby the trough is positioned to carry a spoon so that it will drain into the vessel.

2. A spoon holder comprising a sheet-metal plate, a wire inserted along the two sides and across one end of the plate and projecting from the other end and forming hooks, and a tongue extending from the same end of the plate as the hooks.

In testimony whereof I have signed my name to this specification.

G. L. STEVENS.